Figure 1:
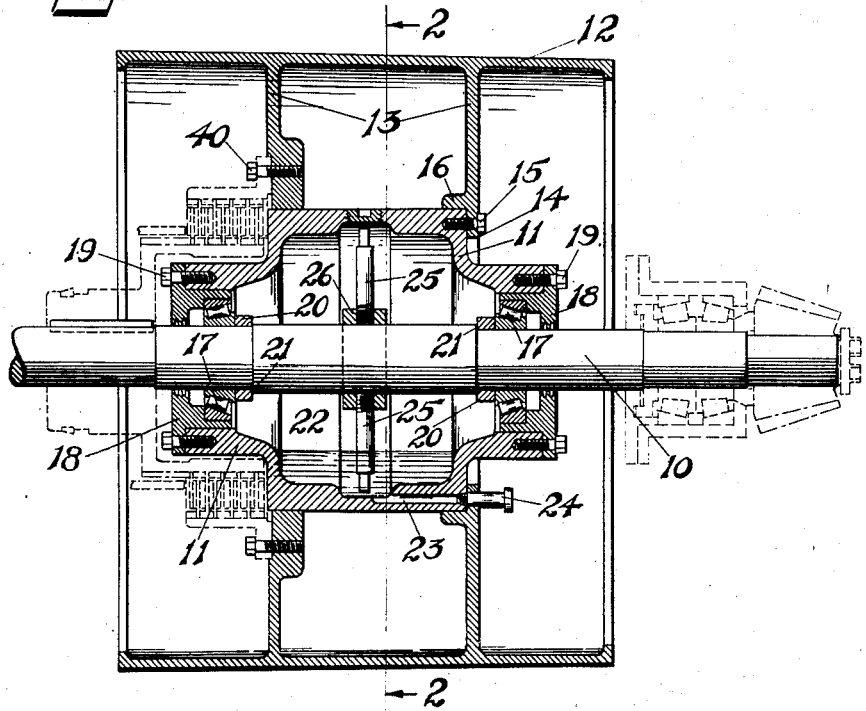

Jan. 23, 1934.  C. W. VALENTINE ET AL  1,944,284

PULLEY

Original Filed May 18, 1929

Inventors
Charles W. Valentine, Peter N.
Ottersland, Guye A. Fairbanks
By their Attorneys Patented Jan. 23, 1934

1,944,284

UNITED STATES PATENT OFFICE 1,944,284

PULLEY

Charles W. Valentine, Peter N. Ottersland, and George A. Fairbanks, Watertown, N. Y., assignors to The Bagley and Sewall Company, Watertown, N. Y., a corporation of New York Original application May 18, 1929, Serial No. 364,018. Divided and this application August 2, 1930. Serial No. 472,580

1 Claim. (Cl. 308—117)

This invention relates to a pulley.

The application is a division of our pending application, Serial No. 364,018, filed May 18, 1929.

It is an object of the invention to provide a novel form of pulley construction and means for lubricating the bearings of the same.

With this general object in view, the invention further consists in certain arrangements, combinations, and details of construction which will first be described in connection with the accompanying drawing and then more particularly pointed out in the appended claim.

Figure 2:
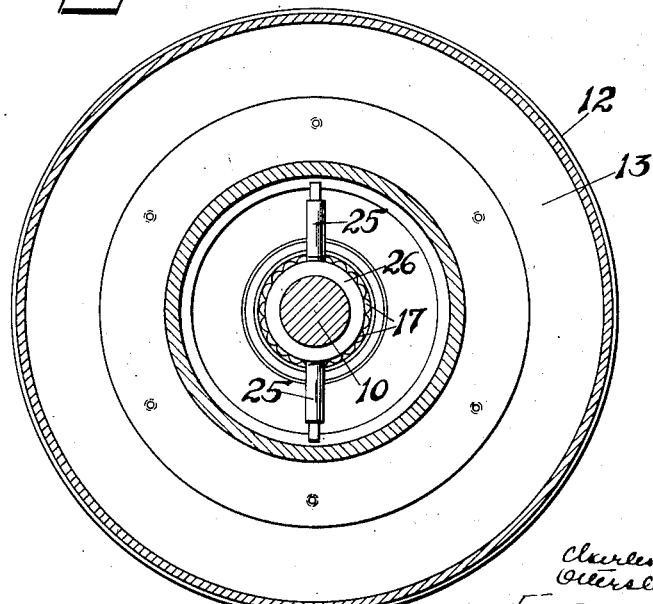

In the drawing:

Figure 1 is a longitudinal sectional view of a pulley constructed in accordance with the invention; and Figure 2 is a cross-section as on line 2—2 of Figure 1.

The particular mechanism selected to illustrate the invention includes a cone pulley which is mounted on a shaft 10, and is adapted either to run idly thereon without driving the shaft or to be coupled to the shaft to rotate the same, this pulley being a driven one.

While capable of various constructions, in that here illustrated as an example, the pulley comprises a hub 11 situated on shaft 10, a rim 12, and flanges 13 functioning as arms to connect said rim to said hub. The hub is advantageously made separately and the rims and flanges integral and cast as one piece. Such construction avoids internal shrinkage strains in the casting such as occur when a heavy hub and light rim are cast in one piece, and, in addition, possesses advantages in manufacturing, as the parts may be finished in different machines. The most important advantage is that the construction permits the use of a large hollow hub, as presently described.

Means are provided for fastening the integral rim and flanges to the hub. As shown, part of one flange extends partially along one end of the hub as at 14 and is attached thereto by suitable fastening members, such as bolts 15. Said flange is advantageously provided with inward axial projections 16 which seat on the periphery of the hub. These projections serve to maintain the rim and flanges properly centered on the hub and the parts accurately aligned and to augment the stability and rigidity of the construction.

The design of the pulley shown is such that the flanges are arranged symmetrically with respect to the rim and near the center thereof. The rim, consequently, extends axially from the flanges in both directions. The rim extensions afford shielding protection to the parts situated within. As already stated, the pulley illustrated is a cone pulley, hence, the rim is tapered axially, although the taper shown is not large.

Means are provided for mounting the hub on the shaft to enable it to run idly thereon with minimum friction. In this example, said means embody antifriction bearings, specifically roller bearings 17. The illustrated exemplification shows the bearings positioned at the ends of the hub in flanges 18, the latter being attached to the hub ends as by bolts 19 or other means. The flanges act to enclose the bearings within the hub and to force them against suitable abutments, such as collars, 20, arranged on the shaft. The collars, in turn, are prevented from axial movement on the shaft by their abutments with shoulders 21 thereon. In this way, the hub is mounted on the shaft by antifriction bearings and the latter are enclosed within the hub in fixed positions on the shaft.

Means are also provided for lubricating the bearings. The lubrication need only occur when the pulley is running idly on the shaft and not when the pulley and shaft are revolving as a unit, for, in that case, the bearings do not act as bearings and there is no internal friction. The lubricating means function to obtain such result.

In the practical form of the invention shown, the hub is hollow and provided with an internal chamber 22. This chamber acts as a reservoir for a supply of oil and may be filled or drained through a drain hole 23 provided with a detachable plug 24. Within the chamber a splasher is located, which, as shown, comprises arms 25 extending radially from the shaft and threaded or otherwise fastened to a collar 26 fixed to said shaft. The splasher is preferably centrally positioned within the chamber so as to act equally on the bearings.

The pulley is constantly rotating and at a speed such that the oil is thrown by centrifugal force to the outer limits of the chamber beyond the bearings and rotates with the pulley. When the pulley runs idly on the shaft and the latter is stationary, the splasher is also stationary and the revolving oil striking the splasher is deflected to the bearings and lubricates the same. When the pulley and shaft are revolving as a unit, however, the splasher is also revolving with the oil, and there is no relative difference in velocity between them. Hence, in this case, the splasher does not function to deflect the oil and the bearings are not lubricated.

There are thus provided means for lubricating the bearings by splash action. There is no tendency for the oil to work out of the bearings to any extent, as the reservoir is only partially filled and there is no pressure back of the oil. No great quantity of oil reaches the bearings and by centrifugal action the tendency is for the surplus to work back into the reservoir.

What is claimed is:

The combination with a shaft, of a pulley loosely mounted on the shaft, said pulley having a one part hub, arm flanges and rim, said rim and flanges being integrally formed and said hub separately formed and means for fastening said flanges to said hub, said hub having an internal oil chamber closed by bearings at the ends of the hub, and means in said chamber for evenly lubricating both the bearings, when the pulley is running idly on the shaft with substantially no lubrication when the pulley is running with the shaft.

CHARLES W. VALENTINE.
PETER N. OTTERSLAND.
GEORGE A. FAIRBANKS.